Dec. 8, 1931.  G. B. PITTS  1,835,808
INDUSTRIAL TRUCK
Filed Feb. 6, 1930   6 Sheets-Sheet 1
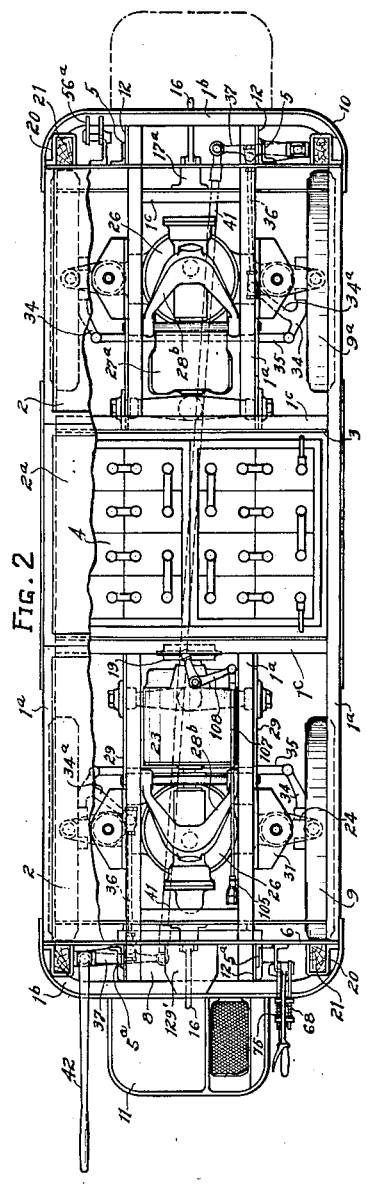
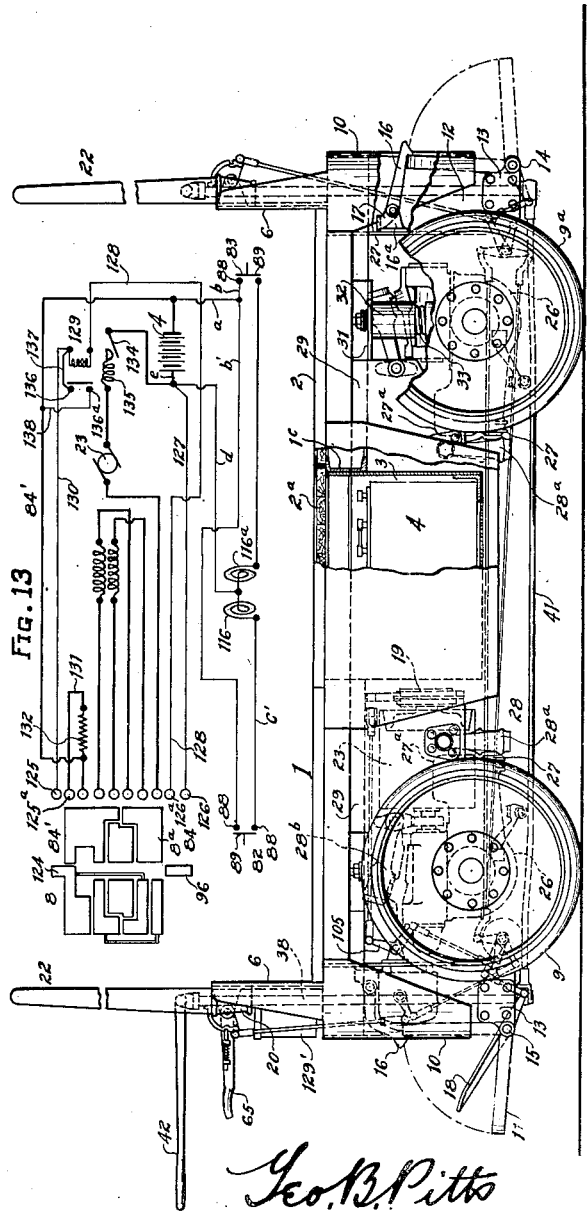
Geo. B. Pitts
INVENTOR
BY Ernest Stewart
ATTORNEY

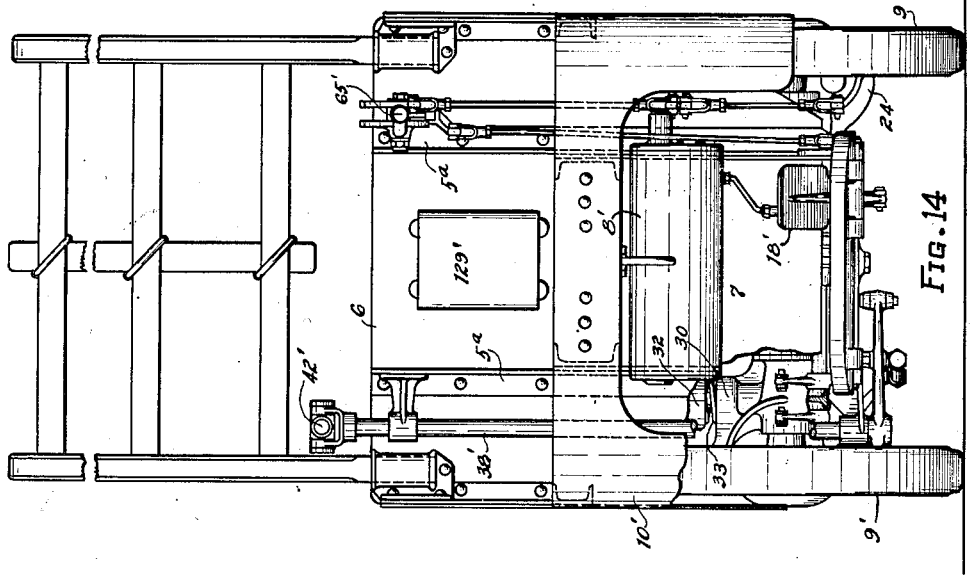
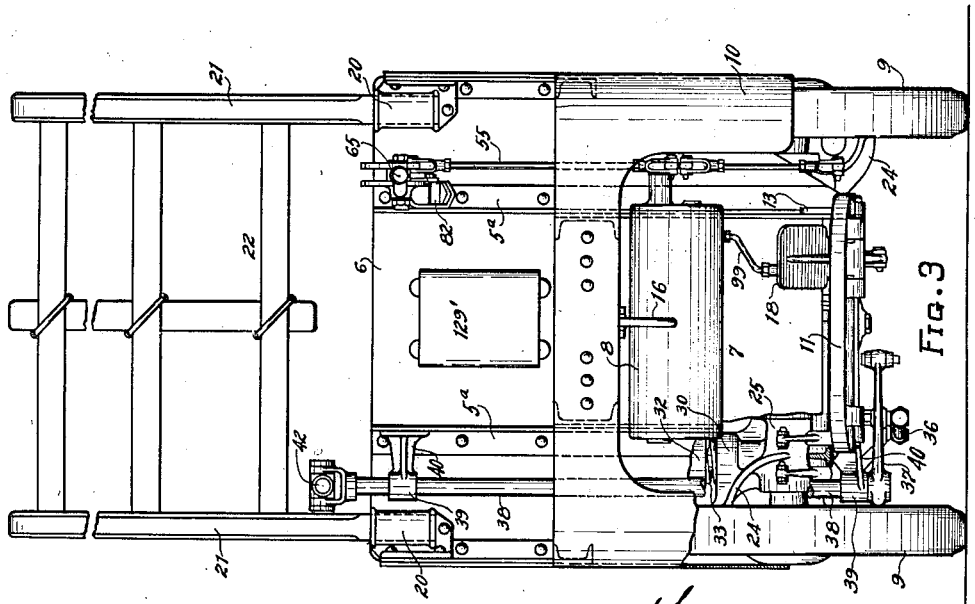

Dec. 8, 1931. G. B. PITTS 1,835,808
INDUSTRIAL TRUCK
Filed Feb. 6, 1930 6 Sheets-Sheet 3
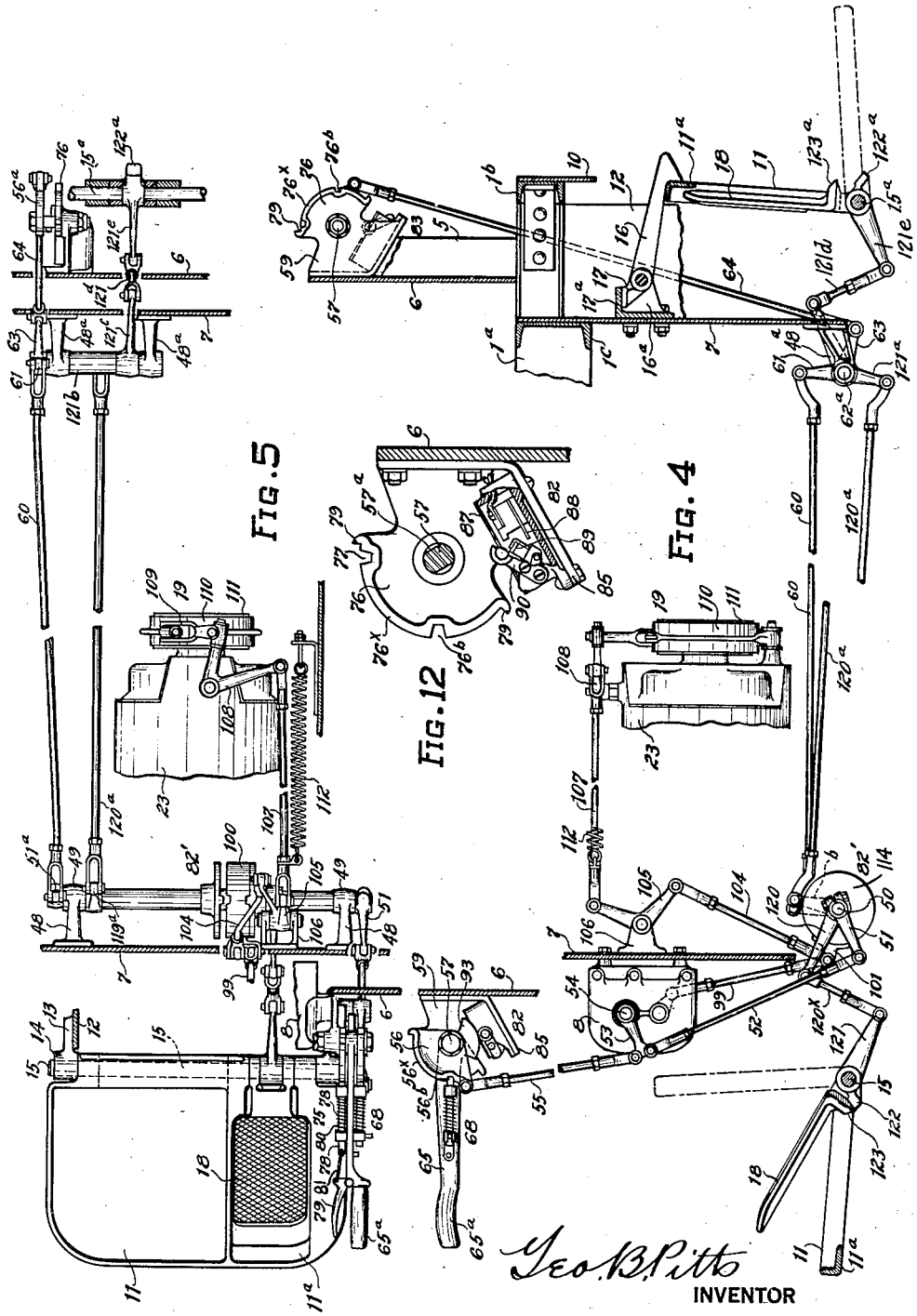

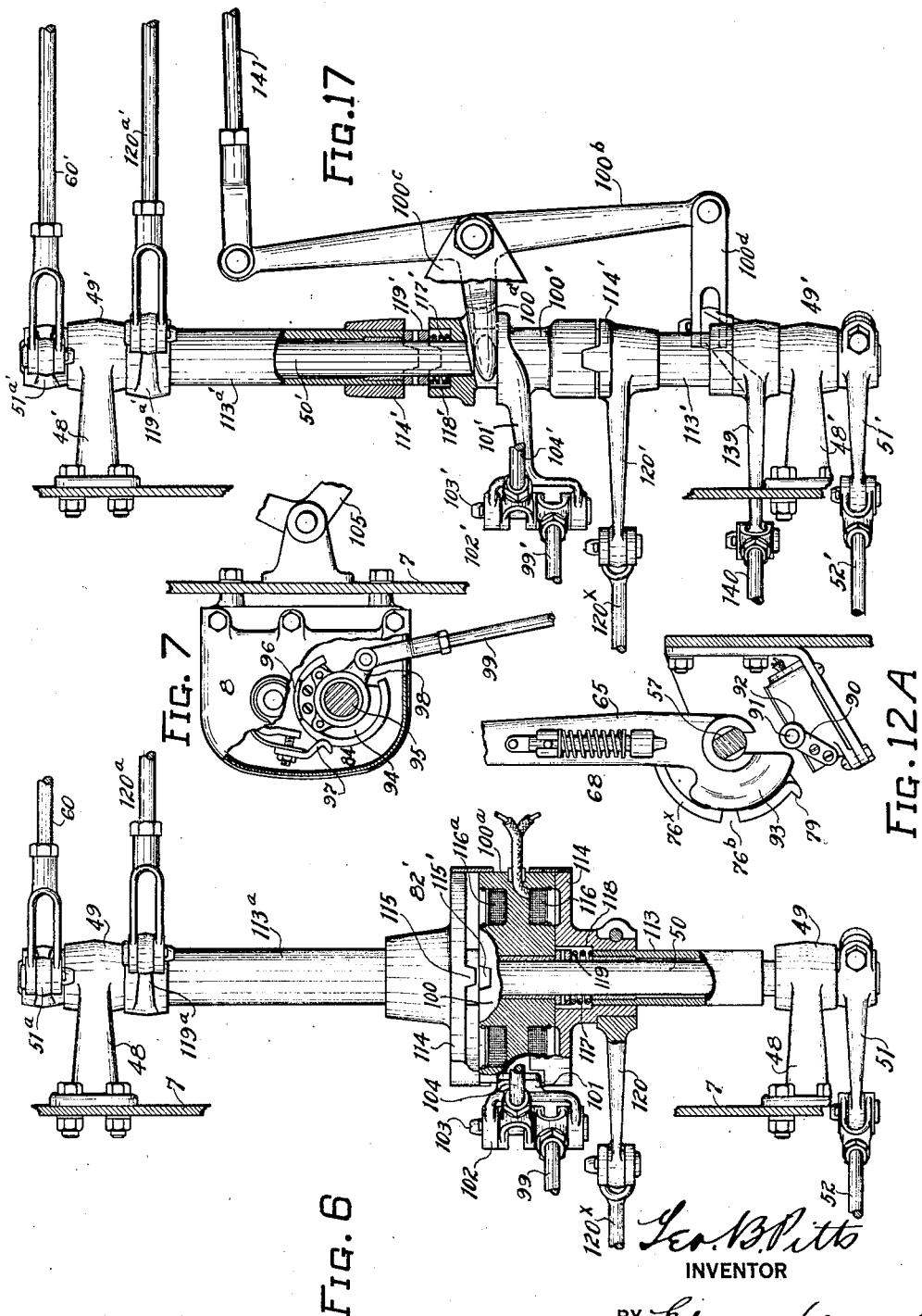

Dec. 8, 1931.                G. B. PITTS                1,835,808
                           INDUSTRIAL TRUCK
                    Filed Feb. 6, 1930        6 Sheets—Sheet 5
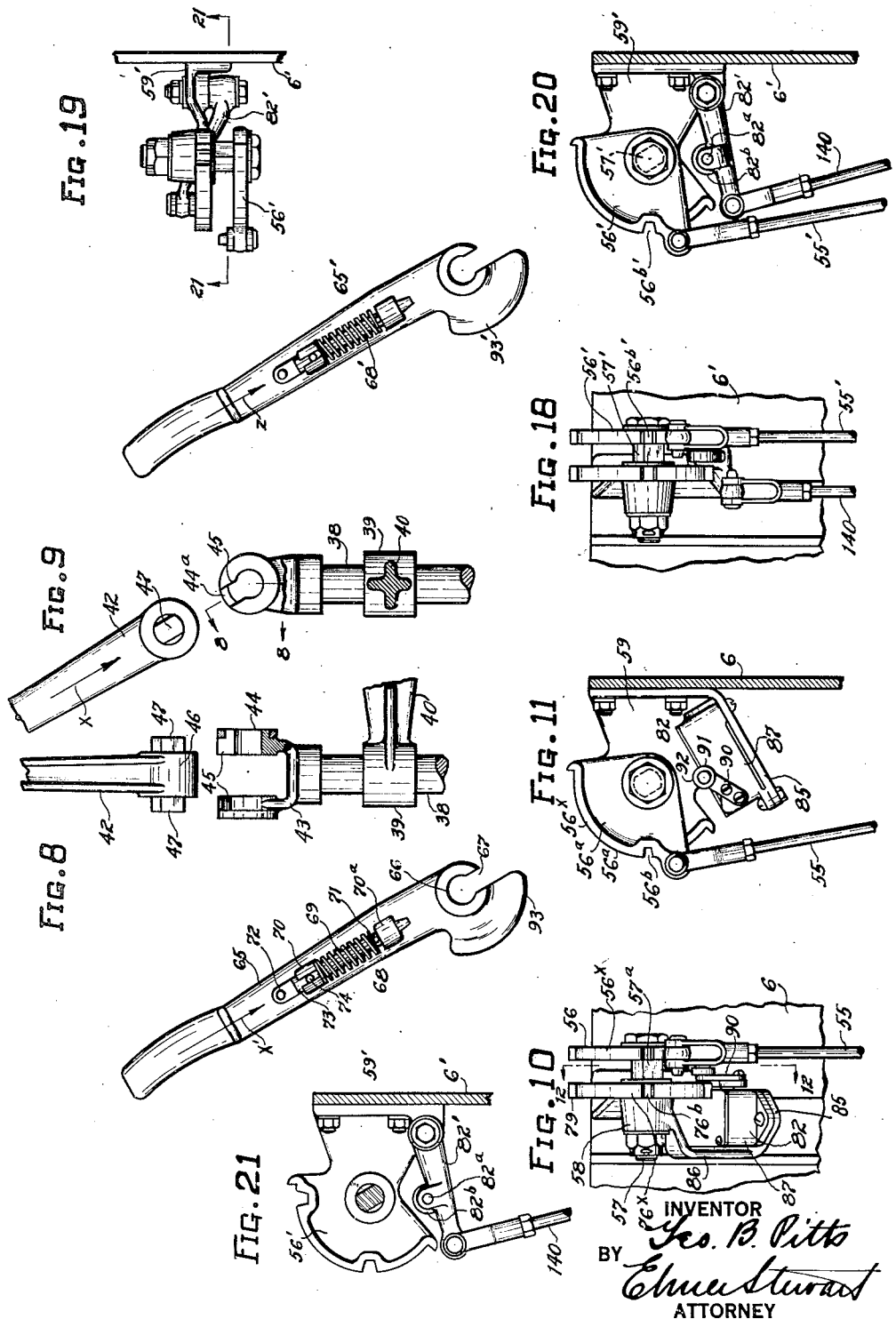
INVENTOR
Geo. B. Pitts
BY Elmer Stuart
ATTORNEY Dec. 8, 1931.  G. B. PITTS  1,835,808
INDUSTRIAL TRUCK
Filed Feb. 6, 1930  6 Sheets-Sheet 6
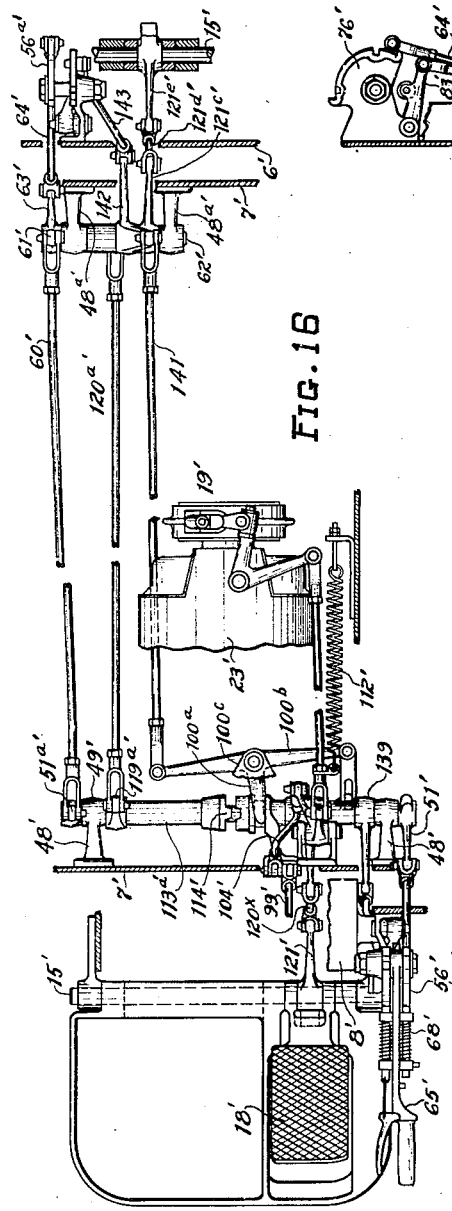
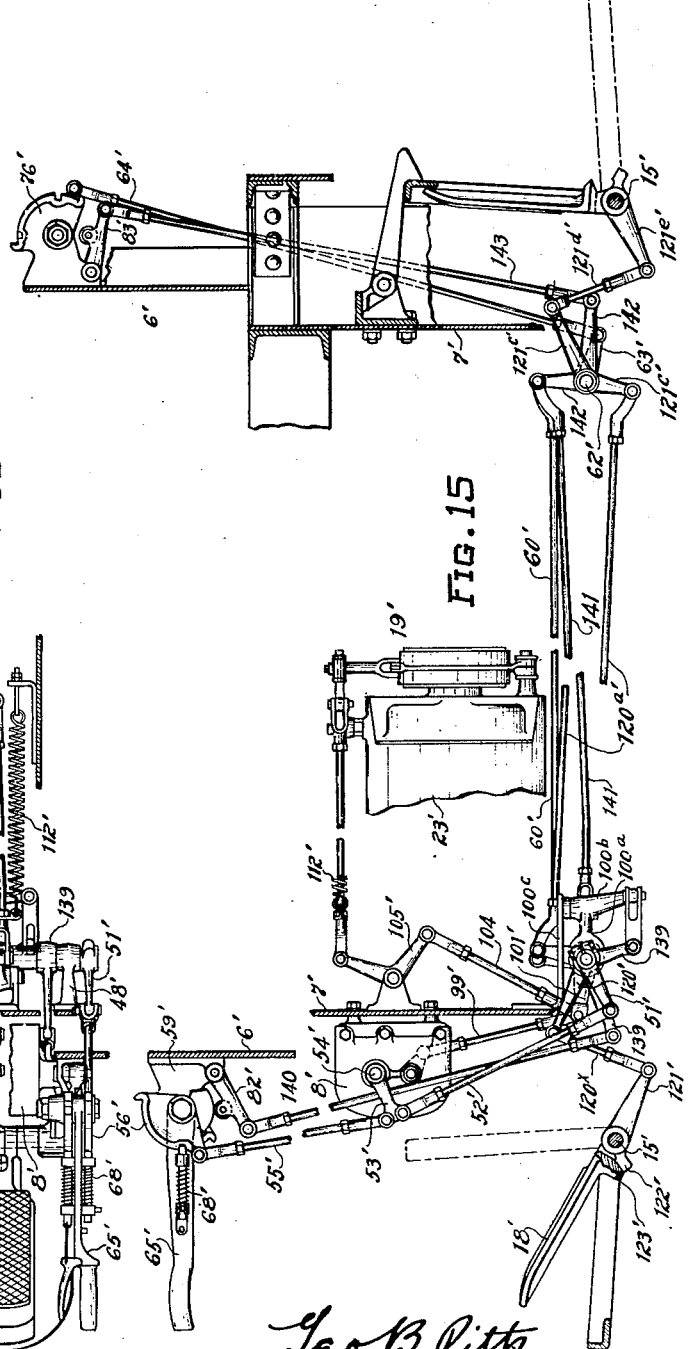
Geo. B. Pitts
INVENTOR
BY Elmer Stewart
ATTORNEY Patented Dec. 8, 1931

1,835,808

UNITED STATES PATENT OFFICE

GEORGE B. PITTS, OF CLEVELAND HEIGHTS, OHIO, ASSIGNOR TO THE BAKER-RAULANG COMPANY, OF CLEVELAND, OHIO, A CORPORATION OF OHIO

INDUSTRIAL TRUCK

Application filed February 6, 1930. Serial No. 426,348.

This invention relates to a power driven truck capable of being driven in either direction from a plurality of stations, these stations in the preferred arrangement being located at the opposite ends of the truck frame. The invention relates to trucks of the industrial type having certain safety features and involves the control of these features while providing for driving and steering of the truck at or from either driving station.

One object of the invention is to provide in a truck of this character having a plurality of operating or driving stations, improved controlling and operating means inter-related with the brake and power supply to permit driving at one station only.

Another object of the invention is to provide in a truck of this character having two operating or driving stations, improved means for controlling the brake for the truck at either station to the exclusion of the other station.

Another object is to provide in a duplex or double end controlled truck improved operating devices, whereby the truck may be operated from one end only at any time.

Another object of the invention is to provide a double end controlled truck having relatively simple control and operating devices for the truck brake and power supply.

A further object of the invention is to provide improved safety devices to prevent operation except when an operative is standing on the platform and certain of the operating devices are in position.

Other objects of the invention will be apparent to those skilled in the art to which my invention relates from the following description taken in connection with the accompanying drawings, wherein Fig. 1 is a side elevation of a truck embodying my invention.

Fig. 2 is a view, partly in plan and partly in section, of the truck; the platform being broken away.

Fig. 3 is an end view looking toward either end of the truck as shown in Figs. 1 and 2 (parts being broken away), except that at one or the other end the operative's platform and the brake control pedal are raised for reasons which will later appear.

Fig. 4 is a fragmentary view showing in section certain supporting members of the truck and in side elevation the controlling means for the truck brake and power supply.

Fig. 5 is a view, partly in plan and partly in section, of the parts shown in Fig. 4.

Fig. 6 is a fragmentary view of parts shown in Figs. 4 and 5 somewhat enlarged; portions being broken away.

Fig. 7 is a fragmentary section of parts shown in Fig. 4, somewhat enlarged.

Figs. 8 and 9 are fragmentary front and side views, respectively, showing the manner of attaching and detaching the steering device, whereby steering may be effected at either end of the truck.

Fig. 10 is a fragmentary front view of one of the automatically operated switches and mounting for the power supply operating device.

Fig. 11 is a side elevation of parts shown in Fig. 10 and the operating device (detached) showing the manner of attaching the latter.

Fig. 12 is a section on the line 12—12 of Fig. 10.

Fig. 12a is a section substantially similar to Fig. 12, but showing the operating device attached to its mounting but moved to its non-operating position.

Fig. 13 is a diagram of the circuits for the form of construction shown in Figs. 1 to 7, inclusive.

Fig. 14 is a view similar to Fig. 3, but showing a modification wherein the operation of the clutch to effect operation of the truck at one end or the other thereof is effected mechanically.

Fig. 15 is a fragmentary view showing in section certain supporting members of the truck and in side elevation the controlling means for the embodiment shown in Fig. 14.

Fig. 16 is a view, partly in plan and partly in section, of the parts shown in Fig. 15.

Fig. 17 is a fragmentary view of parts shown in Figs. 15 and 16; portions being broken away.

Figs. 18, 19 and 20 are detail front, plan and side views, respectively, the latter showing the manner of attaching and detaching one of the operating devices.

Fig. 21 is a section on the line 21—21 of Fig. 19.

In the drawings, 1 indicates as an entirety, a frame preferably extending in the same horizontal plane from end to end, and comprising inner and outer longitudinal sills 1a, end members 1b connecting the sills together, and intermediate cross members 1c. 2 indicates a platform suitably secured to the sills 1a. The platform includes an intermediate removable section 2a to permit access to the battery compartment 3 for enclosing and supporting batteries 4. 5, 5a, indicate pairs of angle bars at the ends of the frame 1 suitably secured to the inner sills 1a, each pair supporting thereon a dash 6. The lower portions of each pair of bars are off-set inwardly and cooperate with the adjacent cross member 1c to support a depending plate 7, one of the latter plates being arranged to support a controller 8. to which reference will later be made. 9, 9a indicate pairs of wheels for supporting the frame 1. 10 indicates a guard depending from each end member 1b in front of the adjacent pair of wheels 9, 9a, the central portion of the guard being cut away to form a receiving space for the adjacent platform 11, when the latter is not in use (as shown at the right hand end of Fig. 1). The end members 1b and guards 10 have rounded corners to reduce the danger of damaging bodies and walls in driving the truck. 12 indicates a pair of plates at each end of the frame 1, disposed longitudinally and secured to and depending from the inner sills 1a. Each pair of plates carries brackets 13 (Figs. 1 and 5) having knuckles 14, in which are mounted the opposite ends of a shaft 15. The shaft 15 forms the pivot about which the operative's platform 11 swings from its down position (see left hand end of Figs. 1, 2, 4 and 5) to its up or inoperative position (see right end of Figs. 1, 2 and 4). In this latter position it is automatically engaged by a gravity operating hook 16, pivoted on a bracket 16a, carried by the adjacent plate 7, the hook 16 having a tail 17 which engages an abutment 17a to hold the hook in operative position. Each shaft 15 also forms a pivot for a foot pedal 18 associated with the adjacent platform 11, so that the pedal may be moved to a non-operating position with the platform. For this purpose, the free end of the pedal 18 overhangs a flange 11a on the platform 11 so that when the latter is swung upwardly it carries the pedal with it and also holds the pedal in the up or non-operating position. When the platform 11 and pedal 18 are down, as shown at the left hand end of Figs. 1, 2, 4 and 5 and also in Fig. 3, the pedal is in operating relation to certain of the brake connections to control the brake, indicated as an entirety at 19, as will later be described.

The dashes 6 constitute end walls for the platform 2. They also carry sockets 20 adapted to removably receive the lower ends of uprights 21, which form the side members of frames 22, the latter serving as extensions of the dashes to increase the loading capacity of the truck.

Either or both pairs of wheels 9, 9a, may be driven and steered, but in the construction shown, both pairs of wheels are steered and one pair (9a) only driven, thereby requiring but a single motor 23. Each pair of wheels is mounted on knuckles provided on the ends of yokes 24 at the opposite ends of an axle 25 and the axle is provided with a housing 26. The housing is provided with an inwardly extended end 27 having a cradle 27a. The housing for the axle for the driven wheels 9 encloses a suitable power transmitting mechanism driven by the shaft of the motor 23. The motor 23 is rigidly secured to the adjacent cradle 27a. Each axle 25 and adjacent housing 26 and extension 27 are connected to the frame 1 by a suspension mechanism indicated as an entirety at 28. Each suspension mechanism 28 comprises two members 28a, 28b, each member being trunnioned at its ends on depending brackets or supports 29 and connected centrally to the extended end 27 and housing 26, respectively, by a universal joint. At each end, each axle 25 is provided with a pocket 30 and the adjacent portion of the inner frame sill 1a carries a casting 31 shaped to form an inverted pocket 32, these pockets being arranged to receive and support a coiled compression spring 33. The parts above described are substantially similar to like parts shown and described in Letters Patent No. 1,628,145, dated May 10, 1927, granted jointly to Edward H. Remde and John H. Hertner, to which patent reference may be made for a fuller description of such parts, no claim thereto being made herein.

The steering connections for the pairs of wheels 9, 9a, comprise the following: The spindle for each wheel is provided with an arm 34, connected by a tie rod 35 to the arm 34 of the other wheel of the pair; one of these arms 34 is provided with a branch arm 34a pivotally connected to one end of a rod 36, the opposite end of the rod 36 being pivotally connected to one arm of a lever 37. The lever 37 is fixed to the lower portion of a steering column 38 rotatably mounted in collars 39 carried by brackets 40 which are supported by the adjacent angle 5 or 5a, a steering column 38 being provided at each end of the truck frame 1. 41 indicates a link connected at one end to the other arm of the lever 37, the opposite end of the link being connected to a similar arm provided on a lever 37 fixed to the steering column 38 at the opposite end of the frame 1, so that when either steering column is operated both pairs of wheels are turned; by connecting the steering columns 38 to one wheel of the pair 9 and the opposite wheel of the pair 9a, the pairs of wheels are turned in opposite directions so as to steer the truck wheels about a common center. The steering columns 38 are at opposite sides of the truck frame at opposite ends thereof so that each will have the same relation to the operative when driving the truck from either end thereof.

As provision is made for operating the truck from one end only at any time, the upper end of each steering column is shaped to have detachably connected to it a steering device, such as a handle 42. For this purpose, the upper end of each column 38 carries a yoke 43 (see Figs. 8 and 9). The ends of the yoke 43 terminate in bosses the inner or opposing faces of which are formed with aligned recesses 44 having annular walls and corresponding sides of these annular walls are formed with slots 45 communicating with the recesses. The inner end of the lever 42 has a hub 46, which fits between the yoke ends or bosses, and ears 47 projecting laterally from the opposite sides of the hub. The ears 47 have a width permitting them to slide through the slots 45 and a length equal to the diameter of the recesses 44, so that when the handle 42 is moved in the direction indicated by the arrow $x$ in Fig. 9 the ears 47 slide into and through the slots 45 into the recesses 44 and engage the annular walls 44a upon the handle being moved to the horizontal position (Figs. 1 and 2). When the handle 42 is attached as just described, it will be connected to the steering column 38 and the latter may be operated in either direction. To facilitate manufacture the yoke ends are machined out to form collars and these collars are cut away to form the slots 45 and rings are pressed or sweated on the outer sides of the collars, the rings preventing the opposite portions of each collar from spreading. This form of construction will be more clearly understood from Fig. 8.

From the foregoing description it will be understood that there is but one handle 42, and this is connected to the steering column at that end of the truck from which it is to be operated. When the operative desires to drive the truck from the opposite end the handle 42 is first swung to the position which coincides with the plane of the slots 45 and then moved endwise outwardly; the handle 42 is then connected to the column 38 at the opposite end of the truck in the manner already set forth.

48 indicates a pair of brackets supported by the depending plate 7 adjacent that end of the truck frame 1 supported by the driven wheels 9. The brackets 48 are provided with collars 49 which rotatably support a rock shaft 50. Fixed to the opposite ends of the shaft 50 are arms 51, 51a, these arms being disposed on the opposite outer sides of the collars so as to prevent endwise movement of the shaft. The outer end of the arm 51 is pivotally connected to one end of a link 52, the opposite end of the link being pivotally connected to an arm 53 fixed to the shaft 54 of the controller 8. The arm 53 is also pivotally connected to one end of a link 55, the opposite end of which is pivotally connected to a segment 56 rotatably mounted on the outer end of a shaft 57. The shaft 57 is stationarily mounted in a boss 58 integrally connected to a bracket 59 fixed to the adjacent dash 6. The segment 56 is swingable from its mid or neutral position (Figs. 1, 4 and 11) in either direction to rotate the controller drum 8a, which, when moved in one direction supplies current from the batteries 4 to the motor 23 to drive the truck in one direction and when moved in the opposite direction, supplies current from the batteries 4 to the motor 23 to drive the truck in the reverse direction. The segment 56 is provided on its edge with an arcuate wall 56x formed with a notch 56b, the purpose of which will later be set forth. 60 indicates a link pivotally connected to the arm 51a at one end; at its opposite end the link 60 is pivotally connected to one arm 61 of a bell crank loosely mounted on a shaft 62a. The shaft 62a is mounted on the plate 7 at the opposite end of the frame 1 by means of brackets 48a. The other arm 63 of the bell crank is connected by a link 64 to a segment 56a, which is constructed and mounted on the adjacent dash 6 similarly to the segment 56, but adjacent the opposite side of the truck. In this arrangement, each segment 56, 56a, (as well as its operating device 65 to be later described) bears the same relation to the operative when the latter stands on either platform. The connections between the segments 56, 56a, and the controller drum shaft are so arranged, as will be understood from Figs. 1 and 4 and the foregoing description, that when the operative stands on either platform 11 and faces the truck, movement of the segment downwardly from its mid position will effect driving of the truck in the direction in which he faces and movement of the segment upwardly from its mid position will effect driving of the truck in the reverse direction.

The operating device 65 comprises a handle adapted to be detachably connected or related to either segment 56, 56a. For this purpose that portion of the shaft 57 on which each segment is rotatably mounted is flattened on its opposite sides as shown at 57a (see Fig. 12) in planes beyond the limit of angular movement of the segment, and the inner end of the operating device 65 is formed with a transverse opening 66 the walls of which rotatably fit the shaft 57 and the wall of this opening is cut away to form a slot 67, communicating with the opening 66 and having a width to receive the shaft 57 when the operating device is positioned in a plane parallel to the flattened sides 57a, and then moved endwise as indicated by the arrow x' (Fig. 11). By moving the device 65 in this direction, the shaft 57 will be positioned within the opening 66. If then the device is swung downwardly or upwardly the walls of the opening will interlock with the shaft. To connect the operating device 65 to the segment, I provide it with a trigger 68 the nose of which is adapted to project into the notch 56b to interlock the device and segment together. The arcuate wall 56x provides a suitable surface for the trigger nose to ride on when being moved into interlocking position (see Fig. 4) or to its detaching position or to an inoperative position (see Fig. 12a) to be later referred to. The notch 56b is so arranged that the trigger nose projects thereinto when the operating device 65 is in horizontal position (see Fig. 1), the controller being in neutral position when the operating device 65 is horizontal. The trigger 68 comprises a rod 69 slidable in a pair of guides 70, 70a, mounted on one side of the operating device. The rod is provided with a fixed collar 71 between which and the outer guide 70 is an expansion spring normally acting to project the rod inwardly, which movement is limited by the collar engaging the inner guide 70a. The outward movement of the rod may be limited by a stop 72. The guide 70 is formed with a slot 73 through which projects a pin 74 fixed to the rod. By grasping the pin 74, the rod may be moved outwardly to effect its release from the notch 56b.

I also prefer to provide a separate trigger mechanism indicated as an entirety at 75, for locking the operating device 65 in its mid position or in a nonoperating position when mounted in connected relation with either segment 56, 56a, the device being moved to this latter position when the truck is not in use, so that it will be out of the way. Certain parts of the trigger mechanism 75 are carried by the operating device 65 and the remaining parts are carried by each bracket and associated with the adjacent segment 56 or 56a. 76 indicates a plate preferably formed integrally with each bracket 59 and having an arcuate wall 76x, this wall being formed with a notch 76b, which aligns with the notch 56b, and a notch 77 at the upper end of the wall 76x. 78 indicates a trigger, the nose of which may project into either notch. The trigger nose is adapted to ride on the wall 76x when the operating device 65 is operated from mid position in either direction to operate the adjacent segment 56 or 56a, or when the device 65 is disengaged from the latter and is moved to the detaching position (Fig. 11) or to the non-operating position (Fig. 12a), stops 79 being provided at the ends of the wall 76x to limit the movement of device in either direction. It will be noted that the operating device 65 is moved to a point between its non-operating position and the position it occupies when moved upwardly to the extreme upper position, to operate the adjacent segment 56 or 56a, so that when the device is moved to either extreme controller operating position or to its non-operating position it remains interlocked with the shaft 57. The trigger 78 is mounted similarly to the trigger 68, but on the opposite side of the device 65 therefrom, except that the trigger 78 is connected to and retracted against a spring 80 by a handle 79 pivoted on the handle portion 65a of the device 65 and connected by a link 81 to the outer end of the trigger.

The trigger mechanism 75 serves to lock the handle 65 likewise the adjacent segment 56 or 56a to the plate 76 when it is in horizontal position, which corresponds to the neutral position of the controller 8. To operate the controller in either direction the trigger mechanism 75 is operated, that is the trigger 78 is released from the notch 76b, following which the handle 65 and the adjacent segment may be moved in either direction. If the trigger handle 79 is released after the handle 65 has been moved, the trigger 78 will ride on the arcuate wall 76x and drop into the notch 76b and lock the handle 65 when the latter is returned to cut off the current. Upon operating the trigger mechanism 75 as just described, the handle 65 may be moved to its non-operating position (see Fig. 12a), where the trigger 78 may drop into the notch 77 and lock it in such position. When the handle 65 is to be positioned in this manner, the trigger mechanism 68 is first operated to release it from the adjacent segment.

In my construction I provide two cut-outs or switches, indicated as entireties by the numerals 82, 83, respectively, each of which is associated with one of the segments and is automatically controlled when the operating device 65 is mounted in connected relation to such segment 56, or 56a, and detached therefrom, and a separate cut-out or switch indicated as an entirety at 84, (Fig. 7), and common to both brake pedals, which cut-out is automatically operated when either brake pedal 18 is depressed to release the brake 19 and elevated to apply the brake, the separate cut-out being inter-related with each of the cut-outs 82, 83, so that it is effective to close the circuit only after one of the circuits controlled by the cut-outs 82, 83, has been closed; that is, the cut out 84 is operated by that element to which each pedal is automatically connected when the operating device 65 is positioned at either driving station. As a result, when the operating device is not positioned at either station, both foot pedals are ineffective to close the switch 84, but when the device is positioned at one station the adjacent pedal is effective to close the switch 84 but the other pedal is ineffective.

The cut-outs 82, 83, close circuits in each of which is included the coil of a magnetically operated clutch mechanism, indicated as an entirety at 82′, which operates to connect either foot pedal 18 with the brake 19, accordingly as one circuit or the other is closed, so that upon operation of that foot pedal which has been connected in, the brake 19 will be released and controlled. The clutch mechanism is so arranged and operated that only one foot pedal may be connected to the brake at a time, thereby making the other pedal inoperative.

As the cut-outs 82, 83, are similar in construction, it will be necessary to describe but one of them, as follows: 85 indicates a base connected to the base portion of the adjacent bracket 59 and by a hanger 86 to the boss 58. Mounted on the base 85 is a casing 87 in which are mounted stationary contacts 88. 89 is a movable contact adapted to engage the contacts 88, but normally held out of contact therewith, as shown in Fig. 12, by a spring (not shown). The shaft for the movable contact 89 extends through the wide wall of the casing 87 and carries a crank 90. The outer end of the crank is provided with a stud shaft 91 on which loosely rotates a roller 92. 93 indicates a cam formed integrally with the inner end of the handle 65 and so arranged that after the handle is engaged with the shaft 57 and moved toward its mid-position, it will engage the roller 92 and swing the crank downwardly, as shown in Fig. 4 and effect engagement of the contact 89 with the contacts 88. The cam 93 is so shaped, that it will maintain the contacts in engagement during movement of the handle from its mid or horizontal position to the extreme movement of the controller in either direction, but upon movement of the handle 65 to the attaching and detaching position or to its non-operating position, the cam 93 will allow the movable contact 89 to disengage the contacts 88 and thus open the circuit. When this circuit is open, current cannot be supplied to the motor 23. From the foregoing description it will be seen that the mechanical operation of (1) attaching or positioning the operating handle and connecting it to either segment 56, 56a, serves to close the adjacent switch 82 or 83 automatically and (2) detachment or removal of the handle serves to automatically open the adjacent switch. As will later be described, the circuits controlled by the switches 82, 83, are so arranged that when the handle 65 is positioned and connected to either segment 56, 56a, the controller 8 may be operated to supply current to the motor 23, except as such current supply may be controlled by the separate cut-out 84. The separate cut-out or switch 84 is closed by the operation downwardly of either foot pedal 18 to close a circuit; and operation of the pedal upwardly, due to the influence of the spring 70 which applies the brake 19, opens the switch.

The separate cut-out 84 comprises a disk or wheel 94 rotatably mounted on one end of and movable relative to the controller drum shaft 95 and carrying a contact 96. 97 indicates a brush suitably mounted within the controller casing and arranged to engage with the contact 96 when the latter is moved about the shaft 95. The disk or wheel 94 is provided with an arm 98 to which is pivotally connected to the upper end of a link 99. The other end of the link is connected to some portion of the brake connections that is operated when either foot pedal 18 is depressed or operated, such portion in the illustrated form of construction comprising the intermediate or main clutch element 100 of the clutch mechanism 82′. The annular wall 100a of the element 100 is provided with a radially extending arm 101, the outer end of which is shaped to provide a yoke 102. The yoke 102 supports a shaft 103 which forms the pivot for the lower end of the link 99. The shaft 103 also forms the pivot for the lower end of a link 104, pivotally connected at its upper end to one arm of a bell crank 105. The bell crank is fulcrumed on a standard 106 carried by the plate 7. The other arm of the bell crank 105 is connected by a link 107 to one arm of a second bell crank 108, suitably fulcrumed on the casing of the motor 23, the other arm of the bell crank being connected to the levers 109 which in turn operate the brake shoes 110 into and out of engagement with the brake wheel 111. The brake wheel 111 is fixed to an extended end of the shaft of the motor 23. 112 indicates a sprig connected by preference to the link 107 and to some stationary part of the frame 1 (see Fig. 5) and normally operates to hold the shoes 110 in braking engagement with the wheel 111, so that upon operation downwardly of either pedal 18, the brake is released, and the switch 84 closed.

113, 113a, indicate sleeves disposed upon opposite sides of the clutch element 100 and each rotatably and slidably fitting the shaft 50. At its inner end, each sleeve 113, 113a, is provided with a disk 114 having on its face a plurality of clutch teeth or members 115 adapted to engage or project into recesses or pockets 115′, each disk being formed of soft iron and serving as an armature for the magnetic clutch mechanism. As shown in Fig. 6, the clutch element 100 is formed on its opposite faces with annular recesses in which are mounted coils 116, 116a, the coil 116 being energized when the switch 82 is closed and the other coil (116a) being energized when the switch 83, is closed. As the handle 65 is shown in Fig. 1 in operating relation to the segment 56, the coil 116 is energized and the armature 114 is connected to the clutch element 100 (Figs. 5 and 6). I provide between the clutch element and each sleeve 113, 113a, a compression spring 117 (only one being shown) normally operating to disengage the adjacent disk or armature from the clutch element, so that upon the de-energization of either or both coils, the disk or disks will be released therefrom and thus prevent release of the brake 19 should anyone operate either pedal downwardly. For this purpose, I enlarge the opening in the hub portion of each disk to form a recess 118 and provide in this recess a collar 119 which abuts against the face of the clutch element 100, the collar being preferably fixed to the shaft 50 and cooperating with the collar 119 at the opposing side of the clutch element to prevent movement thereof endwise of the shaft.

The sleeve 113 has fixed to it an arm 120. The outer end of the arm 120 is connected by a link 120x with a lever 121 fulcrumed on the shaft 15, the lever having a pad 122 arranged to be engaged by the tail 123 of the adjacent foot pedal 18, when the latter is in operating position, as shown in Fig. 4, and upon operation of the pedal 18 downwardly, the tail 123 will act through the pad 122, lever 121, link 120x, arm 120, sleeve 113, magnetic clutch 82', link 104 and parts connected thereto to release the brake 19. As will be understood from Fig. 5, the pedal 18 is provided with spaced portions which rotatably fit the shaft 15 and the tail 123 is arranged between these portions.

The sleeve 113a has fixed to it an arm 119a. The outer end of the arm 119a is connected by a link 120a with a lever 121a fixed to a sleeve 121b loosely mounted on the shaft 62a. The sleeve 121b carries a second lever 121c connected by a link 121d with a lever 121e fulcrumed on the shaft 15a, the lever having a pad 122a arranged to be engaged by the tail 123a of the adjacent pedal 18, when the latter is in operating position; and upon the positioning of the handle 65 in connected relation to the adjacent segment 56a, the effect of which would be to energize the coil 116a and connect the sleeve 113a to the clutch member 100, operation of the adjacent pedal downwardly would effect release of the brake 19.

It will be noted that the separate switch 84 is closed and opened by the clutch member 100, so that upon the connection of either sleeve 113, 113a, thereto, the operation of that pedal connected to the sleeve so connected will close the switch 84 and set the controller in electrical relation to the batteries 4 and motor 23, whereby operation of the handle 65 will effect operation of the motor and driving of the truck.

The windings 116, 116a, are wound in opposed relation and the clutch member is preferably so designed that if the handle 65 is in position at one driver's station and some one (purposely or otherwise) should obtain a second handle and position it at the other driver's station, one coil will substantially neutralize the other, and so reduce the magnetic attraction upon the disks 114 that the sleeve already connected to the clutch member 100 will become released therefrom and both sleeves will remain disconnected from the clutch member until one of the handles is detached.

The circuit for the winding or coil 116a may be traced as follows: from one side of the battery 4, lead a, lead b, contacts 88 of switch 83, movable contact 89, and lead c, to one terminal of winding 116a; from its other terminal, lead d and lead e to the other side of the battery. The circuit for the coil 116 may be traced as follows: from one side of battery, lead a, lead b', contacts 88 of switch 82, movable contact 89 and lead c' to one terminal of the winding; from its other terminal, lead d, and lead e to the other side of the battery.

The motor circuit is controlled by the separate switch or cut-out 84 and an auxiliary switch 84', which is closed when the controller drum is in neutral position and opened when the drum is rotated in either direction to drive the truck at the different speeds provided. Accordingly, in the event the brake 19 is applied (either pedal 18 allowed to swing to its normal position—see left hand end of Figs. 1, 2 and 4) when the controller 8 is in driving position, either forward or reverse, it will be cut out (even though the pedal may be again operated) until the controller 8 is brought to neutral position and the pedal operated. The auxiliary switch comprises a contact plate 124 on the controller drum and contacts 125, 125a, which form part of the circuit closed by the switch 84. With the controller in neutral position, operation of either foot pedal will close the switch 84 to make the following circuit: from contact device 96 of switch 84, contact 126, lead 127 and lead e to one side of the battery 4; from contact device 96, contact 126a, lead 128, coil of an electro-magnet 129 (enclosed in casing 129'—Figs. 1, 2 and 3), lead 130, contact 125, contact plate 124, contact 125a, lead 131, resistance 132 and lead 133 to the other side of the battery. The magnet coil will operate its armature, which (a) closes the switch 134 (automatically opened by a suitable blow out coil 135) and (b) connects the contacts 136, 136a, which closes a shunt circuit from the coil 129, through lead 137, contacts 136, 136a, and lead 138, which is connected to the lead 133, to maintain the coil of the magnet 129 energized and the switch 134 closed; accordingly, it will be seen that if the switch 84 is opened, due to the upward movement of either pedal 18, the circuit through the magnet coil is broken, the coil is de-energized and the motor circuit becomes broken and can only be re-established first by the movement of the controller drum to neutral position (to effect closing of the auxiliary switch 84') and then operation of the pedal 18 downwardly. With the switches 84 and 134 closed, it will be understood from the diagram (Fig. 13) that the controller may be operated to drive the motor 23 in either direction, at different speeds. As these circuits for controlling the speed of the motor form no part of the present invention, it will not be necessary to trace them in detail.

From the foregoing description it will be seen that the truck may be driven by an operative when standing on either platform and after (a) the steering device 42 has been positioned and connected to the adjacent steering column, (b) the operating device 65 has been positioned and connected to the adjacent segment 56 or 56a, and (c) the adjacent foot pedal 18 has been pushed downwardly. When these devices are positioned as just described, the platform 11 and pedal 18 at the opposite end of the truck are raised and locked by the adjacent hook, although the operation of the truck is not affected if this platform and pedal are left in their normal position. It will also be seen that the detachment of the operating device at the remote end of the truck serves to disconnect automatically the brake 19 from the foot pedal 18 at that end and the attachment of the operating device 65 in operating position at the other end automatically throws in the connections between the adjacent foot pedal and the brake 19, so that operation of the truck is only possible from that end at which the device 65 is positioned. As these connections are alternately effected through a member which is common to both foot pedals, it will also be seen that only one pedal can be operated at any one time. Also, it will be noted that when the operating device is not attached to either segment 56, 56a, (1) both of the brake connections are disengaged from the clutch member 100 so that both pedals are ineffective, and (2) the spring 112 operates to (a) apply the brake to prevent movement or coasting of the truck and (b) open the switch 84 so that any operation of the controller would be ineffective to supply current to the motor.

In Figs. 14, 15, 16, 17, 18, 19, 20 and 21, I have shown a different embodiment of my invention in which the connections between the foot pedals 18', 18' and the brake 19' are effected alternately by mechanical mechanism and the operation thereof is effected by mechanically operated connections controlled by the attachment or detachment of an operating device 65'.

As the frame and the wheels therefor, wheel mountings, the motor 23', motor mounting, brake 19', steering connections, steering column 38' and the attachable and detachable steering device 42' are similar in construction with Figs. 1 to 13, inclusive, it will not be necessary to repeat the description thereof.

Referring to Figs. 14 to 21, inclusive, 50' indicates a shaft rotatably supported in collars 49' carried by brackets 48', the latter being supported by the plate 7' at one end of the truck frame. At its opposite ends, the shaft 50' has fixed to it arms 51', 51a'. The outer end of the arm 51' is pivotally connected to one end of a link 52', its opposite end being pivotally connected to an arm 53' fixed to the shaft 54' of the controller 8'. The arm 53' is also pivotally connected to one end of a link 55', the opposite end of the latter being pivotally connected to a segment 56', constructed and mounted similarly to the segment 56, on the dash 6' and movable to operate the controller 8'. The arm 51a' is pivotally connected to one end of a link 60'; the opposite end of the link 60' is connected to one arm 61' of a bell crank fulcrumed on a shaft 62' supported by brackets 48a' which are secured to the plate 7' at the other end of the truck. The other arm 63' of the bell crank is connected by a link 64' to the segment 56a', which is constructed and mounted similarly to the segment 56a on the adjacent dash 6', at the opposite side of the truck from the segment 56'.

The operating device 65' is similar in construction to the device 65 and is engaged with and interlocked with the shaft 57' for either segment 56', 56a'; by movement in the direction of the arrow z (Fig. 20) in the same manner as already described with respect to the device 65; and is detachably locked to the segment by the trigger 68'; however, the cam 93' of the device, when the latter is connected with the shaft 57' and moved downwardly, operates through connections about to be described to connect the adjacent foot pedal 18' with the brake 19' whereby the latter may be released and the truck driven from place to place.

100' indicates a double faced clutch member slidably and rotatably mounted on the shaft 50' and arranged to alternately engage clutch elements 114' carried on the inner ends of sleeves 113', 113a'. The clutch member 100' is provided with an arm 101' having at its outer end a yoke 102' supporting a shaft 103' to which is pivotally connected a link 99' which operates a switch or cut-out (not shown) similar to the switch 84 (already described—see Fig. 7). The shaft 103' has pivotally connected to it a second link 104' which operates through a bell crank 105' to effect release of the brake 19', the latter being similar in construction to the brake 19 and normally applied by a spring 112'. The clutch member 100' is normally maintained in an intermediate position by springs 117' (only one being shown) each surrounding the shaft and interposed between a collar 119' fixed thereto and the bottom wall of a recess 118' formed in the end wall of the clutch member 100' surrounding the shaft 50'. The springs act in opposition to each other to maintain the clutch member disengaged from the clutch elements. The body portion of the clutch member 100' is formed with an annular groove or channel into which fits the bifurcated ends of a yoke 100a' integrally connected to a rocker 100b fulcrumed on a support 100c extending inwardly from the adjacent plate 7'. One end of the rocker 100b is connected by a link 100d to one arm of a bell crank 139; the other arm of the bell crank 139 is connected to the lower end of a rod 140, which is pivotally connected at its upper end to a lever 82' fulcrumed on the base portion of the adjacent bracket 59'. The lever 82' is provided with upstanding lugs which support a shaft 82a on which is loosely mounted a roller 82b. The roller 82b is disposed in the path of movement of the cam 93' carried by the operating device 65' so that when the latter is positioned, the cam serves to swing the lever 82' downwardly; the latter operates through the linkage above described to rock the rocker 100b and the latter operates to move the clutch member 100' into engagement with the clutch element 114'. The clutch element 114' and sleeve 113' have connected to them an arm 120', connected by a link 120x with a lever 121' fulcrumed on the shaft 15', the lever having a pad 122' arranged to be engaged by the tail 123' of the adjacent foot pedal 18', when the latter is in operating position as shown in Fig. 15. The sleeve 113a' carrying the other clutch element 114' is provided with an arm 119a' connected by a link or rod 120a' to one arm of a bell crank 121c' fixed to the shaft 62'. The other arm of the bell crank is connected to a rod 121d' which in turn is connected to a lever 121e' fulcrumed on the shaft 15' at the adjacent end of the truck. The lever 121e' is similar in construction to the lever 121' and is operated by the adjacent pedal 18' in the same manner as in the lever 121'.

The opposite end of the rocker 100b is connected by a link 141 to one arm of a bell crank 142 fulcrumed on the shaft 62', the other arm of the bell crank being connected by a link 143 to a lever 83' associated with the segment 56a'. The lever 83' is constructed and mounted similar to the lever 82', so that when the operating device 65' is positioned and connected to the segment 56a' the cam 93' thereof operates through the lever 83' and linkage connected thereto to swing the rocker to its other position and thereby move the clutch member 100' into clutching engagement with the clutch element 114' connected to the sleeve 113a'.

From the foregoing description it will be seen that when the operating device 65' is positioned and connected to either segment 56', 56a', the clutch member 100' is automatically connected to the brake connections for the foot pedal at the adjacent end of the truck, whereby the brake 19' may be controlled.

The electrical circuits between the batteries 4', switches 84, 84', controller 8' and motor 23' are similar to those shown in Fig. 13, except that the circuits between the batteries, coils, 116, 116a, and switches 82, 83, are omitted.

It will be understood that the switches 82, 83, in the form of construction shown in Fig. 1 and the levers 82', 83', shown in Fig. 15 may be operated by separate manually operated devices and these devices may be in the form of a key or special shaped detachable element, but in the preferred form of construction—as shown—I combine such element and operating member into a single device and arrange for its attachment and detachment at either driving station in such manner that upon its attachment the adjacent foot pedal (which is normally ineffective) becomes effective to release the truck service brake; also, by providing a switch in the motor circuit which is controlled by that portion of the brake mechanism that is disconnected from the portion thereof which is ineffective when the operating device is detached, it will be seen that the motor cannot be operated until the operating device is positioned at one station and can then only be operated after the adjacent foot pedal has been operated to release the brake.

It will be noted that I provide at each driving station three operating devices, to wit, the steering device (42), a device (65) for controlling the supply of current to the motor and a brake operating foot pedal (18), and that the operation of the truck at either station is dependent upon the attachment and detachment of the device 65 which controls the current supply. While this constitutes the preferred embodiment of the invention, it will be seen that either the steering device 42 or the foot pedal 18 may be utilized instead of the device 65. Where the pedal 18 is to be so utilized for this purpose, provision would be made for its attachment and detachment.

To those skilled in the art to which my invention relates many changes in construction and widely differing embodiments and applications of my invention will suggest themselves without departing from the spirit and scope thereof. My disclosures and the description herein are purely illustrative and are not intended to be in any sense limiting.

What I claim is:

1. In a power driven vehicle having a plurality of driving stations, a wheel mounted frame, a brake mechanism thereon, a pedal at each station, means arranged to connect and disconnect each pedal with said mechanism, a mounting at each station and a device arranged to be removably associated with each said mounting for controlling said connecting and disconnecting means.

2. In a power driven vehicle having a plurality of driving stations, a wheel mounted frame, a brake mechanism thereon, a pedal at each station, means arranged to connect and disconnect each pedal with said mechanism, said means including springs normally maintaining each said means in disconnected relation, a mounting at each station, and a device arranged to be removably associated with each said mounting for controlling said connecting and disconnecting means, the said means being automatically connected to the adjacent pedal when said device is associated with one of said mountings and automatically disconnected therefrom when said device is removed.

3. In a power driven vehicle having a plurality of driving stations, a wheel mounted frame, a brake mechanism thereon, a pedal at each station, a mounting at each station, a device adapted to be removably positioned in each of said mountings, and means between each pedal and the adjacent mounting and the brake mechanism arranged to be operated by the positioning of said device in either of said mountings for connecting the adjacent pedal to said brake mechanism.

4. In a power driven vehicle having a plurality of driving stations, a wheel mounted frame, a brake mechanism thereon, a driving mechanism for certain of the wheels for said frame, a pedal at each station, a mounting at each station, including means for operating said driving mechanism, a device adapted to be removably positioned in each of said mountings for connection with said operating means, means between each pedal and the adjacent mounting arranged to be operated by the positioning of said device in either of said mountings for connecting the adjacent pedal to said brake mechanism, and means arranged to be actuated by said brake mechanism for controlling said driving means.

5. In a power driven vehicle having a plurality of driving stations, a wheel mounted frame, a brake mechanism thereon including an operating member, a foot pedal at each station, a device for each pedal arranged to be connected to and disconnected from said operating member, operating connections between said device and the adjacent pedal, means for selectively connecting said devices to said operating member, said means including a movable element at each station, and an element adapted to be removably positioned at each station and arranged to operate said movable element, whereby the device for the pedal adjacent said station is connected to said operating member.

6. In a power driven vehicle having a plurality of driving stations, a wheel mounted frame, a brake mechanism thereon including an operating member, a foot pedal at each station, a device for each pedal arranged to be connected to and disconnected from said operating member, operating connections between each said device and the adjacent pedal, means extending to each station for connecting the adjacent device to said operating member, and an operating device adapted to be removably positioned at either station and arranged when positioned to operate the adjacent connecting means.

7. A vehicle as claimed in claim 5 in which means are provided for normally maintaining said operating member and devices in disconnected relation.

8. In a power driven vehicle having a plurality of driving stations, a wheel mounted frame, a brake mechanism thereon, an operating member, connections between said member and said brake mechanism, a foot pedal at each station, a device for each pedal arranged to be connected to and disconnected from said member, operating connections between said device and one of said pedals, and a plurality of means, one for each station, for connecting said devices respectively to said member.

9. In a power driven vehicle having a plurality of driving stations, a wheel mounted frame, a brake mechanism thereon, a pedal at each station, an intermediate member on said frame connected to said brake mechanism for operating it, separate members each arranged to be connected to said intermediate member, connections from each said separate member to one of said pedals, and means at each station for connecting one of said separate members to said intermediate member.

10. In a power driven vehicle having a plurality of driving stations, a wheel mounted frame, a brake mechanism thereon, a pedal at each station, an intermediate member on said frame connected to said brake mechanism for operating it, separate members each arranged to be connected to said intermediate member, connections from each said separate member to one of said pedals, and means at each station for connecting one of said separate members to said intermediate member.

11. In a power driven vehicle having a plurality of driving stations, a wheel mounted frame, a brake mechanism thereon, a pedal at each station, means arranged to connect and disconnect each pedal with said brake mechanism, a driving means for certain of the wheels for said frame, a device at each station for controlling said driving means, an operating device arranged to be detachably connected to either of said controlling devices and an element on said operating device arranged, when said device is positioned, to operate said first mentioned means to connect the adjacent pedal to said brake mechanism.

12. In a power driven vehicle having a plurality of driving stations, a wheel mounted frame, a brake mechanism thereon, a pedal at each station, means arranged to connect and disconnect each pedal with said brake mechanism, said means including a movable member mounted at each said station, a driving means for certain of the wheels for said frame, a device associated with each said movable member for controlling said driving means, an operating device arranged to be detachably connected to either of said controlling devices, and an element on said operating device arranged when the latter is positioned, to operate said movable member.

13. In a power driven vehicle having a plurality of stations, a wheel mounted frame, a brake mechanism thereon, a pedal at each station, operating connections between each pedal and said brake mechanism normally disconnected from the latter, means for driving and steering certain of the wheels, an operating device for each said means arranged to be removably mounted at either station, and means automatically operable when one of said devices is mounted at either station to effect connection of said operating connections between the adjacent pedal and said brake mechanism.

14. In a power driven vehicle having a plurality of driving stations, a wheel mounted frame, a brake mechanism thereon, a pedal at each station, electro-magnetically operated means arranged to connect and disconnect each pedal with said mechanism, and a switch at each station for controlling said connecting and disconnecting means.

15. In a power driven vehicle having a plurality of driving stations, a wheel mounted frame, a brake mechanism thereon, a pedal at each station, electro-magnetically operated means arranged to connect and disconnect each pedal with said mechanism, a mounting and a switch at each station, and a device arranged to be removably associated with each said mounting and for controlling the adjacent switch, the said switch being automatically operated when said device is associated with said mounting.

16. In a power driven vehicle having a plurality of driving stations, a wheel mounted frame, a brake mechanism thereon, a pedal at each station, electro-magnetically operated means arranged to connect and disconnect each pedal with said mechanism, said means including springs normally maintaining each said means in disconnected relation, a mounting and a switch at each station, and a device arranged to be removably associated with each said mounting and for controlling the adjacent switch, the said switch being automatically operated when said device is associated with said mounting.

17. In a power driven vehicle having a plurality of driving stations, a wheel mounted frame, a brake mechanism thereon, a pedal at each station, a mounting at each station, a device adapted to be removably positioned in each of said mountings, a clutch mechanism comprising spaced clutch elements each connected to one of said pedals and an intermediate clutch member connected to said brake mechanism and movable to engage either of said clutch elements, and means arranged to be operated by the positioning of said device in either of said mountings, for operating said clutch member.

18. In a power driven vehicle having two driving stations, a wheel mounted frame, means for driving certain of the wheels for said frame, a brake mechanism thereon, a pedal at each station, an intermediate movable member connected to said brake mechanism, said member being provided with windings, separate operating connections each connected to one of said pedals and including an armature associated with said member, an electric circuit for each of said windings having a switch for closing the circuit to energize the adjacent winding, each said switch being mounted at one of said driving stations, and a device arranged to be removably mounted at each station for controlling said switch.

19. In a power driven vehicle having two driving stations, a wheel mounted frame, means for driving certain of the wheels for said frame, a brake mechanism thereon, a pedal at each station, an intermediate movable member connected to said brake mechanism, said member being provided with windings, separate operating connections each connected to one of said pedals and including an armature, an electric circuit for each of said windings having a switch for closing the circuit to energize the adjacent winding, means between said member and each said armature normally operating to separate them, each said switch being mounted at one of said driving stations, and a device arranged to be removably mounted at each station for controlling said switch.

20. In a power driven vehicle having two driving stations, a wheel mounted frame, means for driving certain of the wheels for said frame, a brake mechanism thereon, a pedal at each station, an intermediate movable member connected to said brake mechanism, said member being provided with windings, separate operating connections each connected to one of said pedals and including an armature, an electric circuit for each of said windings having a normally open switch for closing the circuit for energizing the adjacent winding, each said switch being mounted at one of said driving stations, and a device arranged to be removably mounted at each station and operating to close said switch when positioned and to break said circuit when removed.

21. In a power driven vehicle having two driving stations, a wheel mounted frame, means including an electric motor for driving certain of the wheels for said frame, a switch for the circuit for said motor, a brake mechanism thereon, a pedal at each station, an intermediate movable member connected to said brake mechanism and said switch, said member being provided with windings, separate operating connections each connected to one of said pedals and including an armature, an electric circuit for each of said windings having a switch for closing the circuit for energizing the adjacent winding, each said switch being mounted at one of said driving stations and a device arranged to be removably mounted at each station for controlling the last mentioned switch.

22. In a power driven vehicle having a plurality of driving stations, a wheel mounted frame, a brake mechanism thereon, a driving mechanism for certain of the wheels for said frame, said mechanism including an electric motor, a circuit and a controller having an operating member at each station, a pedal at each station, a device adapted to be removably positioned in each said operating member, and means connected with each pedal arranged to be operated by the positioning of said device in either of said members for connecting the adjacent pedal to said brake mechanism.

23. In a power driven vehicle having a plurality of driving stations, a wheel mounted frame, a brake mechanism thereon, a driving mechanism for certain of the wheels for said frame, said mechanism including an electric motor, a circuit and a controller having an operating member at each station, a pedal at each station, a device adapted to be removably positioned in each said operating member, and means connected with each pedal arranged to be operated by the positioning of said device in either of said members for connecting the adjacent pedal to said brake mechanism, and means arranged to be actuated by said brake mechanism for controlling the circuit for said motor.

24. In a power driven vehicle having a plurality of driving stations, a wheel mounted frame, a brake mechanism thereon, a movable connecting member, connections between said member and said brake mechanism, a foot pedal at each station, a device for each pedal arranged to be engaged by and disengaged from said member, operating connections between each said device and one of said pedals, and a plurality of means, one for each station, for connecting said member to either of said devices.

25. In a power driven vehicle having a plurality of driving stations, a wheel mounted frame, a driving mechanism for certain of the wheels for said frame, said mechanism including an electric motor, a circuit therefor, a controller and a switch in said circuit, a brake mechanism thereon, a pedal at each station, an intermediate member movable on said frame and connected to said brake mechanism and said switch for operating them, separate members each arranged to be engaged by said intermediate member, connections from each said separate member to one of said pedals, and means at each station for moving said intermediate member into engagement with one of said separate members.

26. In a power driven vehicle having a plurality of driving means, a wheel mounted frame, a brake mechanism thereon, a movable connecting member, connections between said member and said brake mechanism, a foot pedal at each station, a device for each pedal arranged to be engaged by and disengaged from said member, means normally operating to maintain said movable member disengaged from said devices, operating connections between each said device and one of said pedals, and a plurality of means, one for each station, for connecting said member to either of said devices.

27. In a power driven vehicle having a plurality of driving stations, a wheel mounted frame, a brake mechanism thereon, a driving mechanism for certain of the wheels for said frame, operating devices at each station for controlling said driving means and said brake mechanism, an operating member arranged to be detachably connected to one of said controlling devices at each said station, and means controlled by the connection of said member for connecting the other operating device to the mechanism operated by it.

28. In a power driven vehicle having a plurality of driving stations, a wheel mounted frame, a brake mechanism thereon, a driving mechanism for certain of the wheels for said frame, operating devices at each station for controlling said driving means and said brake mechanism, respectively, an operating member arranged to be detachably connected to one of said controlling devices at each station, and electro-magnetically operated means actuated by the connection of said member for connecting the other controlling device to the mechanism operated by it.

In testimony whereof, I have hereunto subscribed my name.

GEORGE B. PITTS.